(12) United States Patent
Sha et al.

(10) Patent No.: US 12,150,054 B2
(45) Date of Patent: Nov. 19, 2024

(54) POWER SAVING FOR MOBILE DEVICES IN WIRELESS COMMUNICATION SYSTEMS

(71) Applicant: ZTE Corporation, Guangdong (CN)

(72) Inventors: Xiubin Sha, Guangdong (CN); Bo Dai, Guangdong (CN); Ting Lu, Guangdong (CN); Jie Tan, Guangdong (CN); Xu Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 331 days.

(21) Appl. No.: 17/852,364

(22) Filed: Jun. 29, 2022

(65) Prior Publication Data

US 2022/0330150 A1    Oct. 13, 2022

Related U.S. Application Data

(63) Continuation of application No. PCT/CN2020/107981, filed on Aug. 7, 2020.

(51) Int. Cl.
*H04W 52/02* (2009.01)
*H04W 72/20* (2023.01)
*H04W 76/28* (2018.01)

(52) U.S. Cl.
CPC ....... *H04W 52/0216* (2013.01); *H04W 72/20* (2023.01); *H04W 76/28* (2018.02)

(58) Field of Classification Search
CPC .. H04W 72/20; H04W 76/28; H04W 52/0216
USPC ....................................................... 370/434
See application file for complete search history.

(56) References Cited

U.S. PATENT DOCUMENTS 11,528,676 B2 * 12/2022 Medles ................. H04W 72/21
2020/0178135 A1    6/2020 Yun et al.

FOREIGN PATENT DOCUMENTS

| CN | 105407477 A  | 3/2016 | |
| CN | 105704791 A  | 6/2016 | |
| EP | 3857734 B1 * | 4/2024 | ......... H04B 7/18508 |
| WO | 2013071511 A1 | 5/2013 | |

(Continued)

OTHER PUBLICATIONS

Takeda, Kazui, et. al., Understanding the Heart of the 5G Air Interface: An Overview of Phsical Downlink Control Channel for 5G New Radio (NR) (Year: 2019).*

(Continued)

*Primary Examiner* — Peter G Solinsky
(74) *Attorney, Agent, or Firm* — Perkins Coie LLP

(57) ABSTRACT

Methods, systems, and devices for power savings in mobile devices operating in mobile communication technology are described. An example method of wireless communication includes transmitting, by a first network node to a wireless device, a block of system information, wherein the block of system information is a block of system information of a first type, a block of system information of a second type, or a block of system information of a third type, wherein the block of system information of the first type comprises cell-specific parameters for cell selection or cell reselection by the wireless device, wherein the block of system information of the second type comprises parameters for connection setup or service setup, and wherein the block of system information of the third type comprises parameters associated with a change in system information.

16 Claims, 15 Drawing Sheets

(56) References Cited

FOREIGN PATENT DOCUMENTS

| WO | 2019161044 A1 | 8/2019 | | |
|---|---|---|---|---|
| WO | 2020034327 A1 | 2/2020 | | |
| WO | 2020069135 A2 | 4/2020 | | |
| WO | WO-2020101558 A1 * | 5/2020 | ........... | H04L 1/1812 |
| WO | 2020148582 A1 | 7/2020 | | |

OTHER PUBLICATIONS

IEEE document (Year: 2019).*
3GPP, "Technical Specification Group Services and System Aspects; Release 16 Description; Summary of Rel-16 Work Items [Release 16]," 3GPP TR 21.916 V0.5.0, 115 pages, Jul. 31, 2020.
International Search Report and Written Opinion for International Application No. PCT/CN2020/107981, mailed on May 7, 2021 (10 pages).
Ericsson, "DRX enhancements for NTN," 3GPP TSG-RAN WG2 #107, Prague, Czech Republic, Tdoc R2-1911395, Aug. 2019.
Extended European Search Report for European Patent Application No. 20948393.2, mailed Nov. 15, 2022 (13 pages).
Office Action for Korean Patent Application No. 10-2022-7022345, mailed Jul. 30, 2024, with English summary (7 pages).
Office Action for Chinese Patent Application No. 202080101322.9, mailed Jun. 29, 2024 (6 pages).

* cited by examiner

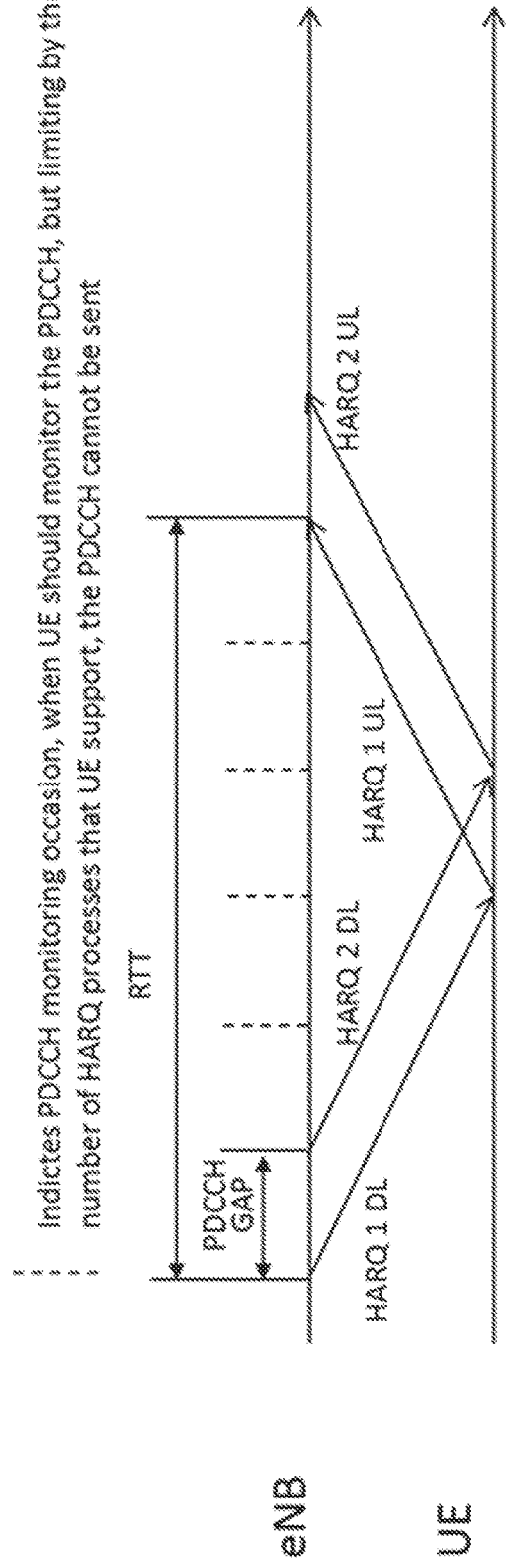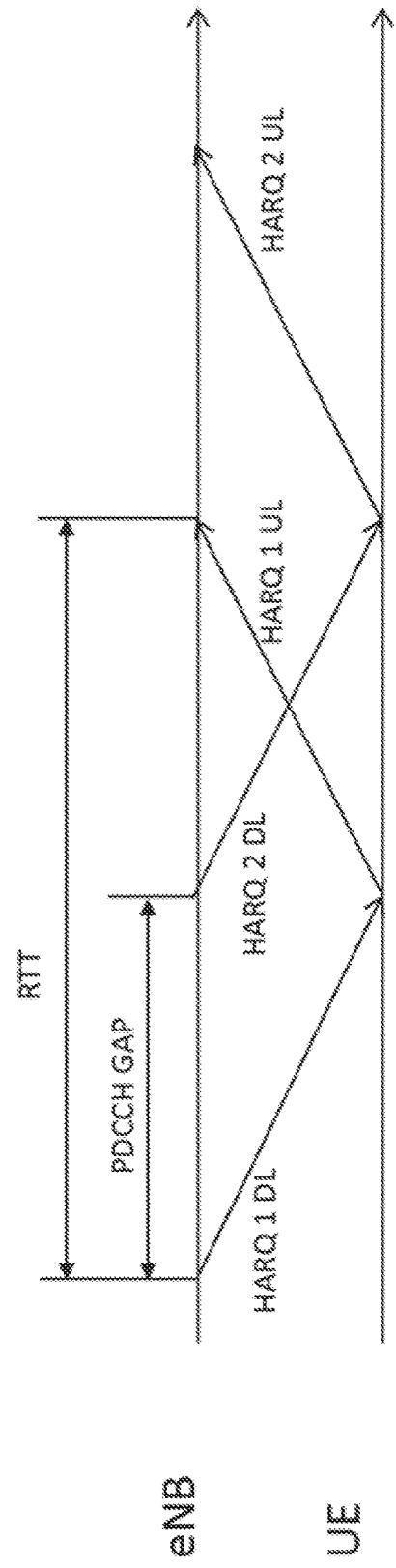
FIG. 3A
FIG. 3B

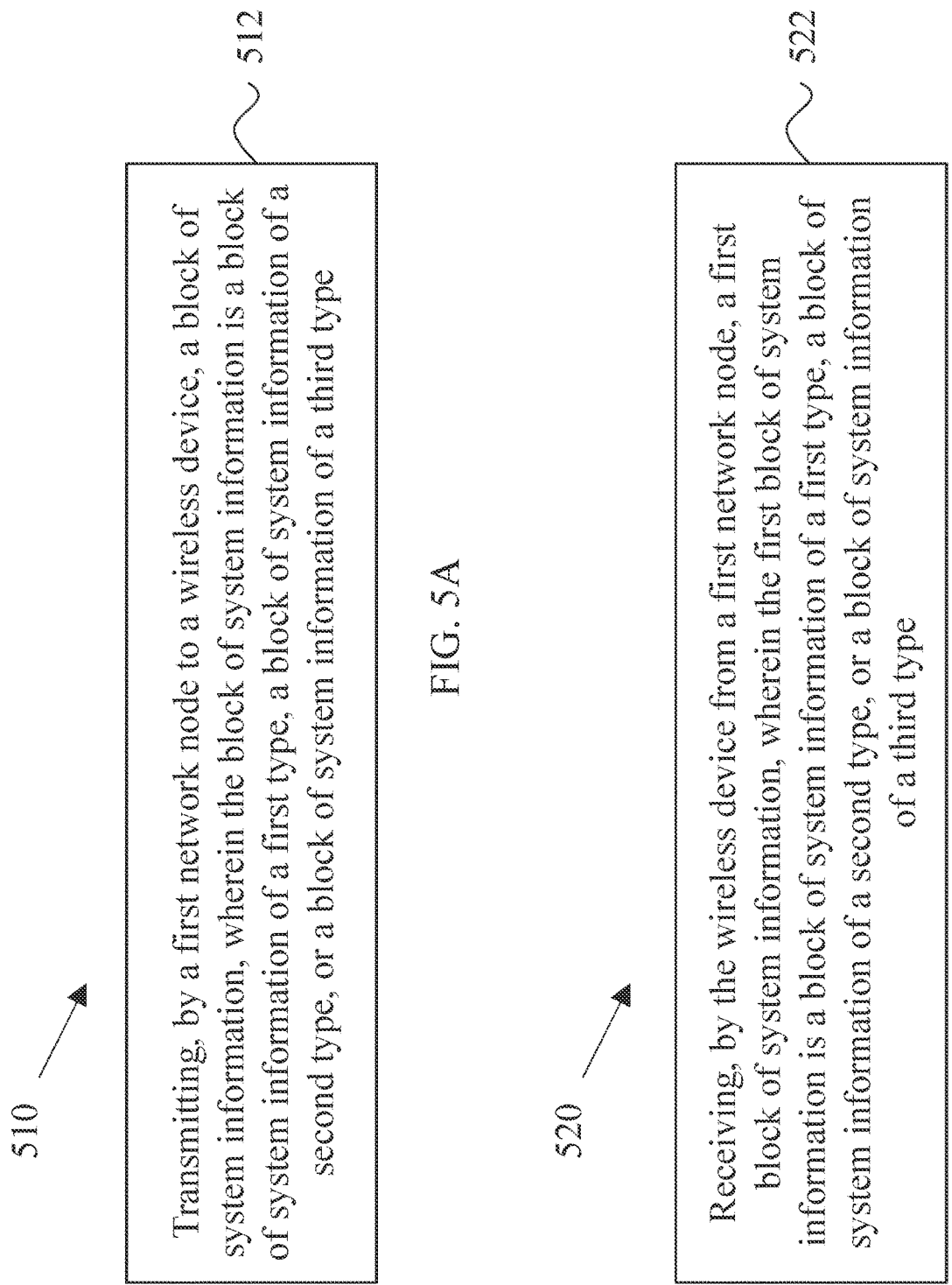

POWER SAVING FOR MOBILE DEVICES IN WIRELESS COMMUNICATION SYSTEMS

CROSS REFERENCE TO RELATED APPLICATIONS

This patent document is a continuation of and claims benefit of priority to International Patent Application No. PCT/CN2020/107981, filed on Aug. 7, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for power savings in mobile devices operating in mobile communication technology, including 5th Generation (5G) and New Radio (NR) communication systems, and when connected to non-terrestrial network nodes.

In one exemplary aspect, a wireless communication method is disclosed. The method includes transmitting, by a first network node to a wireless device, a block of system information, wherein the block of system information is a block of system information of a first type, a block of system information of a second type, or a block of system information of a third type, wherein the block of system information of the first type comprises cell-specific parameters for cell selection or cell reselection by the wireless device, wherein the block of system information of the second type comprises parameters for connection setup or service setup, and wherein the block of system information of the third type comprises parameters associated with a change in system information.

In another exemplary aspect, a wireless communication method is disclosed. The method includes receiving, by a wireless device from a first network node, a first block of system information, wherein the first block of system information is a block of system information of a first type, a block of system information of a second type, or a block of system information of a third type, wherein the block of system information of the first type comprises cell-specific parameters for cell selection or cell reselection by the wireless device, wherein the block of system information of the second type comprises parameters for connection setup or service setup, and wherein the block of system information of the third type comprises parameters associated with a change in system information.

In yet another exemplary aspect, a wireless communication method is disclosed. The method includes monitoring, by a wireless device, a control channel for at most (N−1) control channel monitoring occasions in a time duration corresponding to a round trip time (RTT) between the wireless device and a non-terrestrial network (NTN) node, wherein the RTT comprises N control channel monitoring occasions, wherein the wireless device is configured to receive the control channel at one or more of the N control channel monitoring occasions, and wherein N is a positive integer and N≥2.

In yet another exemplary aspect, a wireless communication method is disclosed. The method includes receiving, by a wireless device from a network node, a block of system information comprising an preference indication of a serving cell or a neighboring cell, and performing, based on the preference indication, one or more cell measurements for a subsequent cell selection or cell reselection process.

In yet another exemplary aspect, a wireless communication method is disclosed. The method includes transmitting, by a network node to a wireless device, a block of system information comprising an preference indication of a serving cell or a neighboring cell, wherein the wireless device is configured to perform, based on the preference indication, one or more cell measurements for a subsequent cell selection or cell reselection process.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 3A shows an example of a Physical Downlink Control Channel (PDCCH) monitoring with inadequate number of HARQ processes.

FIGS. 3B-3F show examples of PDCCH monitoring with reduced UE power.

FIGS. 5A-5E show examples of wireless communication methods.

DETAILED DESCRIPTION

Power savings for wireless devices, e.g., user equipment (UE), are especially important for emerging Internet of Things (IoT) applications, e.g. Narrowband-IoT (NB-IoT) or enhanced Machine Type Communication (eMTC) networks. For an IoT network, frequent System Information (SI) reception, Physical Downlink Control Channel (PDCCH) monitoring, cell reselection and Tracking Area Update (TAU) are the main concerns for UE power savings.

In the example of an IoT network over a Non-Terrestrial Network (NTN) (e.g., NB-IoT or eMTC transmission over satellite, wherein the satellite is an NB-IoT eNB, the satellite is an eMTC eNB, the satellite is an RF of NB-IoT eNB, or the satellite is an RF of eMTC eNB), the low earth orbit (LEO) satellite may move quickly, which may lead the UE to consistently switch coverage from one satellite (e.g., one cell) to another satellite (e.g., another cell) after a predetermined amount of time (e.g., 10 minutes). When the UE moves to a new cell, the UE may be configured to read the SI of the cell. In existing implementations, the UE reads the SI including basic parameters for the UE to select a cell and/or camp on the cell (e.g., cell Access Related Info, cell selection related parameters, etc.), Physical Random Access Channel (PRACH) parameters and Paging Control Channel (PCCH) parameters once the UE enters a new cell. However, frequently accessing the SI may consume a significant amount of UE power (e.g., greater than a predetermined amount of power). In fact, accessing all the SI parameters is typically never required, e.g. for a Mobile Initiated Connection Only (MICO) UE, the PCCH parameters are not required.

In another aspect of IoT over NTN, the round trip delay (e.g. the delay from UE to eNB and the delay from eNB to UE) or the Round-Trip Time (RTT) is very large. Generally, one HARQ process can only be used once in one RTT duration. The maximal number of HARQ processes is typically restricted because it is a function of UE capabilities. If the transmission of the maximal number of HARQ processes cannot occupy the whole RTT duration (as shown in FIG. 3A), the periodic PDCCH monitoring will result in wasted resources.

In yet another aspect of IoT over NTN, the typical cell capacity can only cover an open area (e.g., the ocean or a sparsely populated desert) of a very large coverage area. In a hot-spot area that is densely populated, a Terrestrial Network (TN) should normally be used. Thus, in an area that is overlapped by the NTN cell and the TN cell, the UE must determine how to camp on a suitable TN cell to save UE power.

Embodiments of the disclosed technology are directed to various aspects of UE power savings including, but not limited to, SI reception, PDCCH monitoring, and UE cell selection and reselection.

Figure 1:
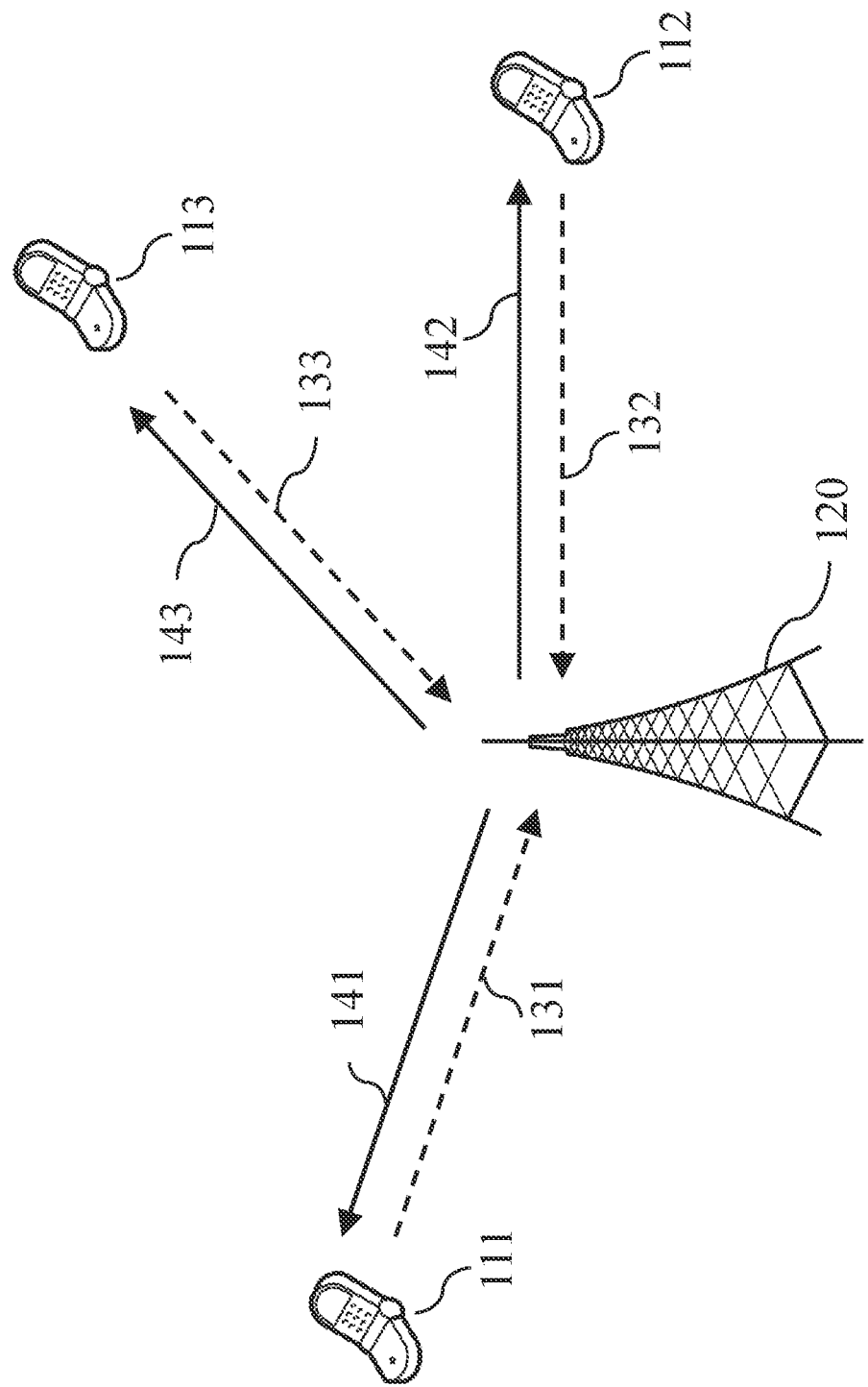
FIG. 1 shows an example of a network node (e.g., base station or gNodeB) and a wireless device (e.g., user equipment (UE)) in wireless communication.

FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include a System Information Block (SIB). The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Example Embodiments for System Information Monitoring and Reception

Figure 2A:
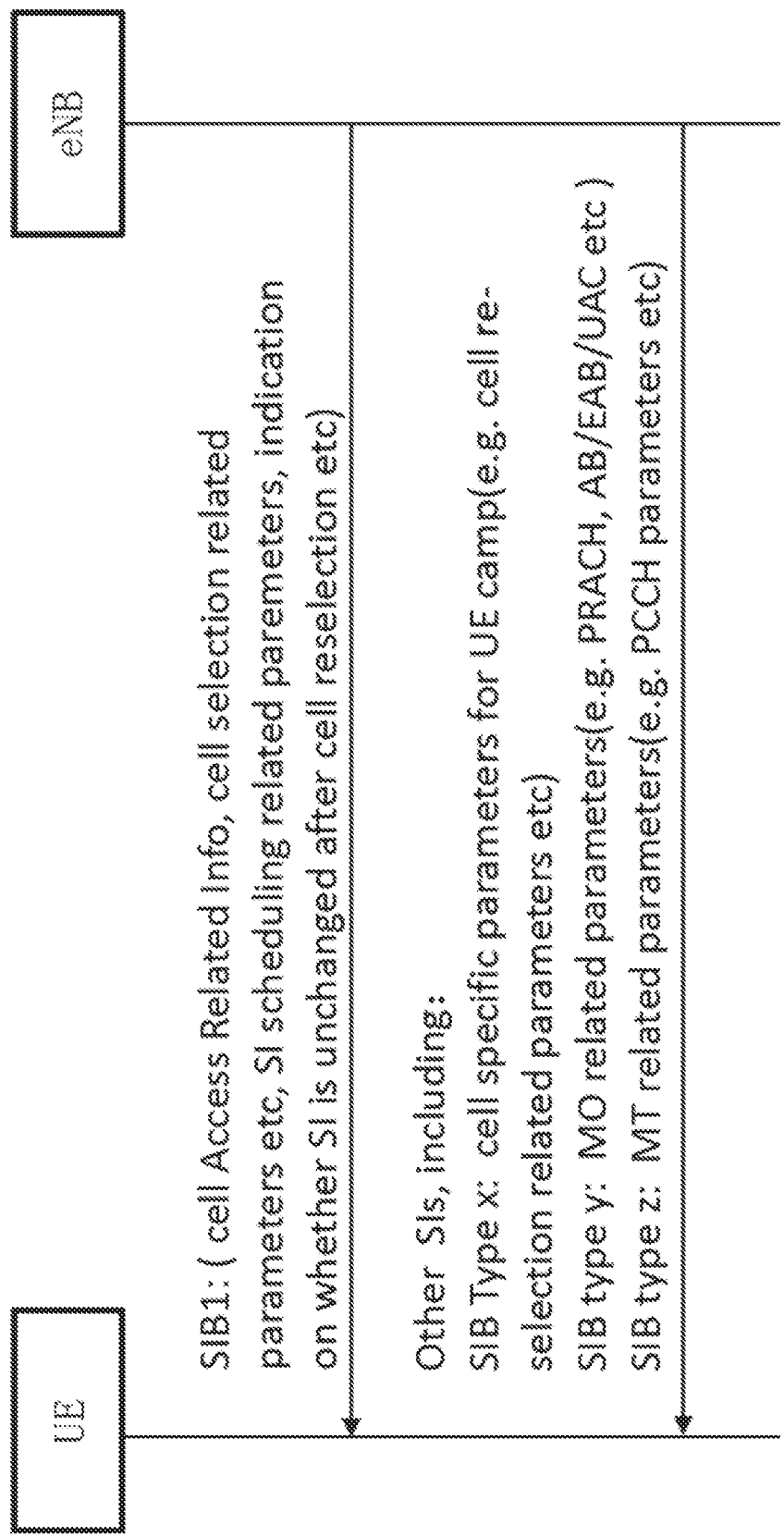
FIG. 2A shows an example of a System Information (SI) acquisition process.

FIG. 2A shows an example of an SI acquisition process. In some embodiments, the SI and/or SIBs are divided into different types based on the characteristics of the parameters (e.g. probability of usage, default values, etc.). In other embodiments, the reception occasions can be configured to be different for different types of SIB. In yet other embodiments, different types of parameters are included in different SIBs and SI.

In some embodiments, and as shown in FIG. 2A, SIB1 only includes the basic parameters that are essential for the UE to select and/or camp on a cell (e.g., cell access related information, cell selection related parameters, etc.) and the parameters that are essential for the UE to receive other SI info (e.g., an indication of whether the SI remains unchanged when reselection to the new cell occurs, SI scheduling related parameters, etc.). In an example, service setup related parameters are not included in SIB 1.

As further shown in FIG. 2A, other SI is communicated using at least the following three types of SIB:

SIB Type x: this type of SIB includes cell-specific parameters that the UE uses to camp on a cell (e.g., cell reselection related parameters, etc.), which are usually different for different cells, and that the UE typically obtain when it reselects a cell. Several of the parameters included in SIB Type x are cell-specific parameters, which are not suitable to include in SIB1. Thus, the UE can be configured to acquire and process this type of SI once it selects or reselects, and camps on a cell, or when the eNB indicates that the SI has changed.

SIB type y: this type of SIB include Mobile Originated (MO) related parameters (e.g., Physical Random Access Channel (PRACH) parameters, Access Barring (AB) parameters, Extended Access Barring (EAB) parameters, Unified Access Control (UAC) parameters, etc.), which are used only when the UE decides to setup a service or establish an RRC Connection. Thus, UE can acquire and process this type of SI only when it decides to setup a service or establish an RRC Connection.

SIB type z: this type of SIB include Mobile Terminated (MT) related parameters (e.g., Paging Control Channel (PCCH) related parameters, etc.), which is used only when the UE is paged, service specific parameters and/or area specific parameters (e.g., the parameter values are usually the same in the area, and one area range is usually larger than one cell range). Generally, the paging parameters can be same in a large area (e.g., in an eNB area or in a TAC area). Thus, UE can acquire and process this type of SI only when it is necessary, e.g., when the SI changes (e.g., the parameters change) and the UE needs to update its SI (e.g. the UE is not Mobile Initiated Connection Only (MICO) and Mobile Terminated (MT) related parameters are needed). In an example, the SI area ID or SI change indication can be used to indicate whether the SI changes, e.g., the SI area ID for a particular SI/SIB changing or the SI change indication indicating that a particular SI changes implies that the SI or SIB has changed.

In some embodiments, and in the example of an NTN network, a satellite (e.g., the satellite being an eNB, the satellite being a gNB, the satellite being an RF of eNB, the satellite being an RF of gNB, etc.) moves rapidly in a predefined orbit. Herein, the UE can be configured to reselect cells in a predetermined sequence, e.g., UE selects cell1, then reselects cell2, then reselects cell3, and so on.

Figure 2B:
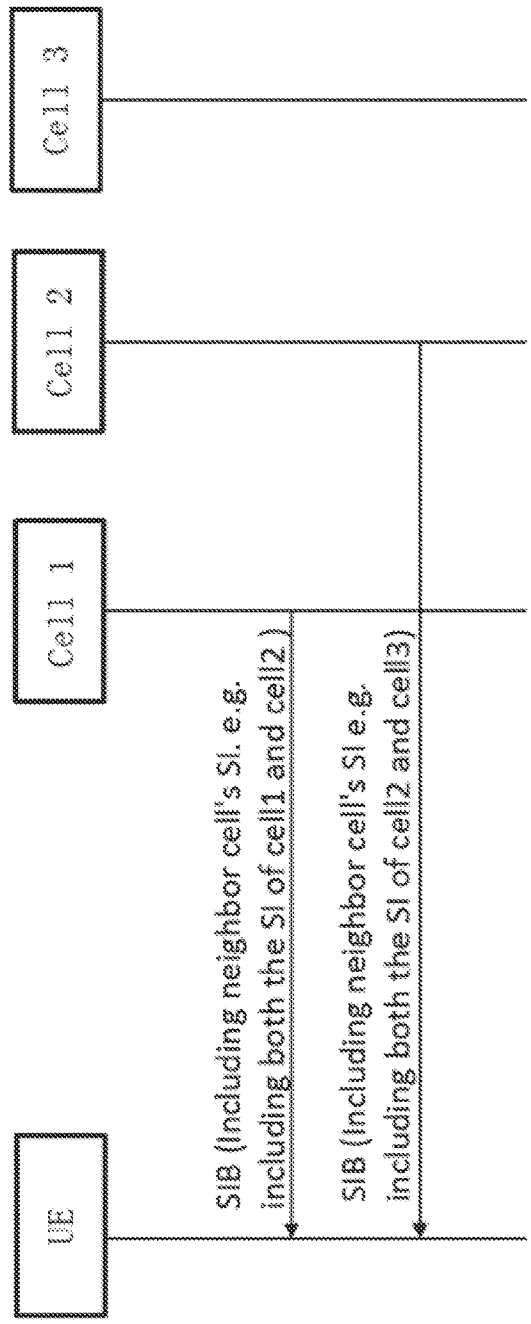
FIGS. 2B and 2C show another example of an SI acquisition process.
Figure 2C:
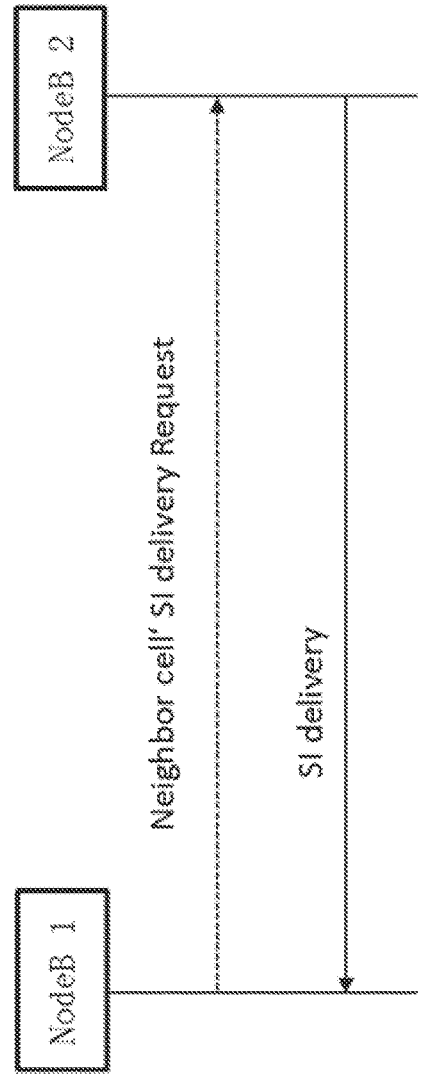

FIGS. 2B and 2C show another example of a System Information (SI) acquisition process. In some embodiments, and as shown in FIG. 2B, cell 1 sends cell 1's SI, which includes a neighbor cell's (e.g. cell 2's) partial or complete SI, to the UE. When the UE camps on cell 1, it can decide whether the neighbor cell (e.g. cell 2) is more suitable to camp on and whether to initiate a reselection process to the neighbor cell (e.g. cell 2) based on the partial or complete SI of cell 2 received from cell 1. When the UE moves from cell 1 to the neighbor cell (e.g. cell 2), it can immediately perform service setup without acquiring the neighbor cell's SI.

Similarly, cell 2 sends cell 2's SI which includes cell 3's partial or complete SI to the UE. When the UE camps on cell 2, it can decide whether cell 3 is more suitable to camp on and whether to initiate a reselection process to cell 3 based on the partial or complete SI of cell 3 received from cell 2. When the UE moves from cell 2 to cell 3, it can immediately perform service setup without acquiring cell 3's SI.

In this example, the SI can further include cell selection and/or reselection related information, which can make the UE aware of all the necessary network information and enable it to determine in advance whether the network, cell or neighbor cell is preferred. The cell selection and/or reselection related information includes at least one of serving cell load information, neighbor cell load information, a service type that serving cell supported, a service type that a neighbor cell supports, antenna information, Radio Access Technology (RAT) information of a neighbor cell, serving cell type (e.g., TN or NTN cell), neighbor cell type (e.g., TN or NTN cell), neighbor cell location information, neighbor cell measurement and/or selection priority, network holographic topology information or a layout plan. This information can improve the user's experience during the cell reselection procedure.

In some embodiments, an SI valid duration is indicated in the SI. In an example, the SI valid duration is an SI valid timer. In another example, the SI valid duration is an SI valid start occasion and/or an SI valid end occasion, which are used for the UE to decide whether the received SI is valid.

In order for a cell to transmit it's neighbor cell's SI, the neighbor cell's SI needs to be exchanged between different NodeB (e.g., eNB and/or gNB). As shown in FIG. 2C, NodeB 1 sends a Neighbor Cell's SI Delivery Request to NodeB 2, which can be sent by an X2 or an Xn common message (e.g., X2 SETUP REQUEST, ENB CONFIGURATION UPDATE, X2AP MESSAGE TRANSFER, XN SETUP REQUEST, NG-RAN NODE CONFIGURATION UPDATE, XNAP MESSAGE TRANSFER, CELL ACTIVATION REQUEST, RESOURCE STATUS REQUEST, or an SI Delivery Request message).

NodeB 2 delivers its cell's SI to NodeB 1, which can be sent based on the NodeB 1's request, or sent by Node B 2 proactively (e.g., when NodeB2 is powered on, the X2 connection is (re-)established, the Xn connection is (re-)established, or can be triggered by the NodeB 2's SI change) via an X2 or Xn common message (e.g., X2 SETUP REQUEST, X2 SETUP RESPONSE, ENB CONFIGURATION UPDATE, ENB CONFIGURATION UPDATE ACKNOWLEDGE, X2AP MESSAGE TRANSFER, XN SETUP REQUEST, XN SETUP RESPONSE, NG-RAN NODE CONFIGURATION UPDATE, NG-RAN NODE CONFIGURATION UPDATE ACKNOWLEDGE, XNAP MESSAGE TRANSFER, CELL ACTIVATION REQUEST, CELL ACTIVATION RESPONSE, RESOURCE STATUS REQUEST, RESOURCE STATUS RESPONSE, or an SI delivery message).

Figure 2D:
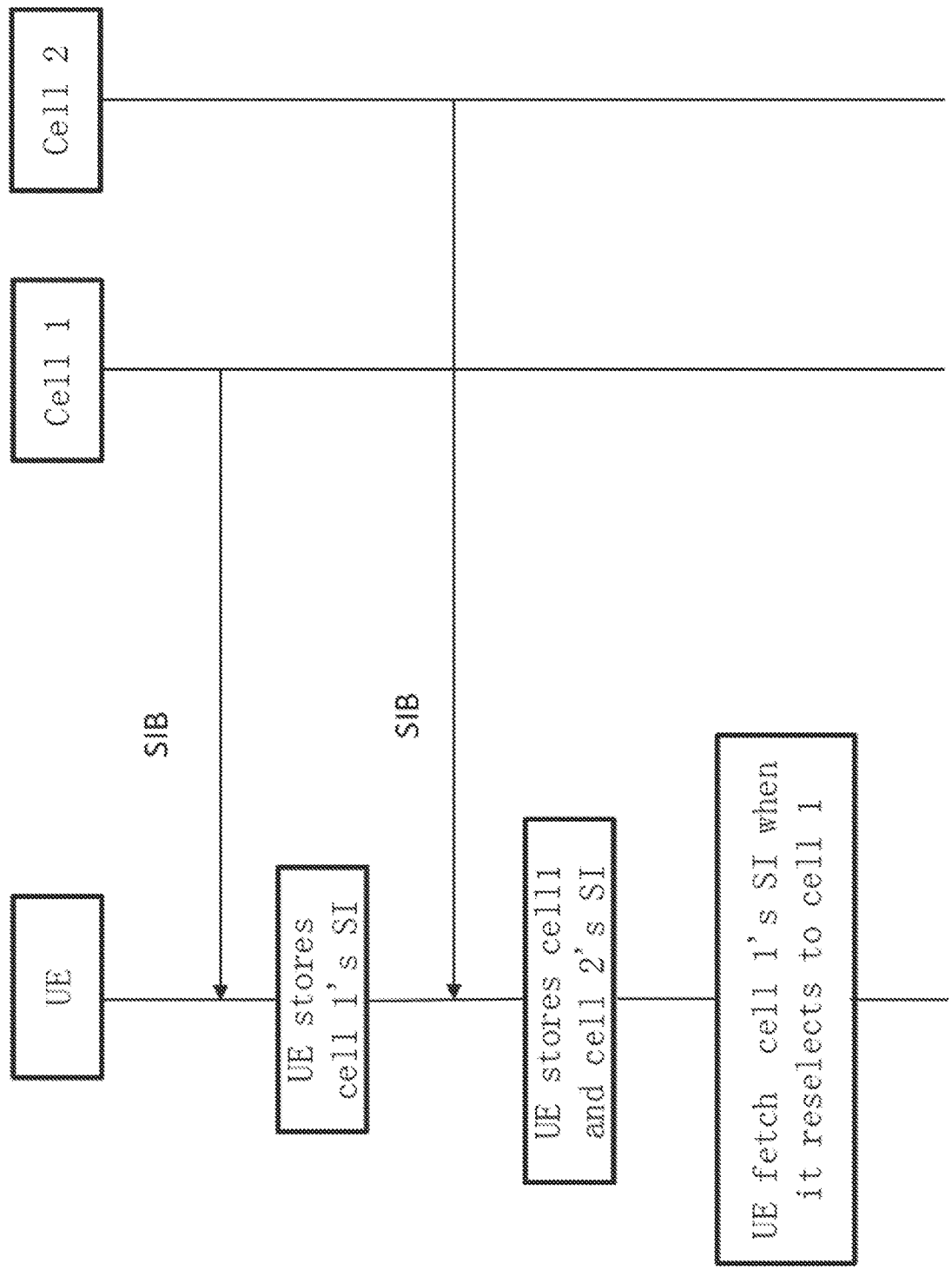
FIG. 2D shows yet another example of an SI acquisition process.

In some embodiments, and as shown in FIG. 2D, the UE can be configured to store SI for each of multiple cells that it ever camps on. Thus, once the UE reselects to a cell whose SI is stored, it can fetch the stored SI information, thereby avoiding having the acquire and process the SI when it reselects to that new cell. This advantageously saves UE power and improves the user's experience during the cell reselection procedure.

In some embodiments, an SI valid duration can also be used for the stored SI. In an example, the SI valid duration is an SI valid timer. In another example, the SI valid duration is an SI valid start occasion and/or an SI valid end occasion, which are used for the UE to decide whether the stored SI is valid.

In some embodiments, the UE can decide whether a cell's SI is stored based on the cell identity (e.g., the cell identity of the reselected cell being the same as the cell identity of the stored SI) or the UE positioning (e.g., when the UE moves to a certain position, it can fetch the stored position of the SI).

Example Embodiments for PDCCH Monitoring

In some embodiments, two HARQ processes are supported by the UE:
HARQ x DL indicates the downlink transmission of HARQ process #x, which can include the transmission of the PDCCH for an uplink (UL) grant, the PDCCH for a downlink (DL) grant and a Physical Downlink Shared Channel (PDSCH).
HARQ y UL indicates the uplink transmission of HARQ process #y, which can include the transmission of the Physical Uplink Shared Channel (PUSCH) and HARQ Acknowledgement (ACK)/Negative ACK (NACK).

Herein, if HARQ x DL indicates the downlink transmission of UL HARQ process #x including the transmission of the PDCCH for an uplink (UL) grant, then HARQ x UL indicates the uplink transmission of UL HARQ process #x including PUSCH. If HARQ x DL indicates the downlink transmission of DL HARQ process #x including the transmission of the PDCCH for an downlink (DL) grant and/or the transmission of the PDSCH, then HARQ x UL indicates the uplink transmission of DL HARQ process #x including HARQ Acknowledgement (ACK)/Negative ACK (NACK).

Usually, if two HARQ processes are supported by the UE, then two downlink HARQ processes and two uplink HARQ processes are simultaneously supported by the UE. For purposes of exposition, the figures and description are directed to HARQ process for a single direction (e.g., only for DL HARQ process, or only for UL HARQ process).

FIG. 3A shows an example of monitoring a Physical Downlink Control Channel (PDCCH) in current implementations. Therein, the dashed lines indicates a PDCCH monitoring occasion that corresponds to when the UE should monitor the PDCCH. However, by limiting the number of HARQ processes that the UE supports, the PDCCH cannot be sent. But this results in the UE monitoring extra PDCCH occasions without detecting a PDCCH, and thus the monitoring wastes resources.

FIG. 3B shows an example of PDCCH monitoring with reduced UE power. As shown therein, using a large PDCCH gap results in there being only two PDDCH occasions for the transmission of two processes, wherein the PDCCH gap is the time interval between two adjacent PDCCH monitoring occasions. Thus, there are fewer PDCCH occasions in the RTT duration and minimal or no waste of resource on monitoring.

In some embodiments, and based on the PDCCH being used to schedule DL transmissions and/or UL transmissions, a suitable number of PDCCH occasion in one RTT duration can be determined as 2×HARQProcessNumber, and the suitable PDCCH gap can be determined as the value nearest to floor(RTT/(2×HARQProcessNumber)).

Figure 3C:
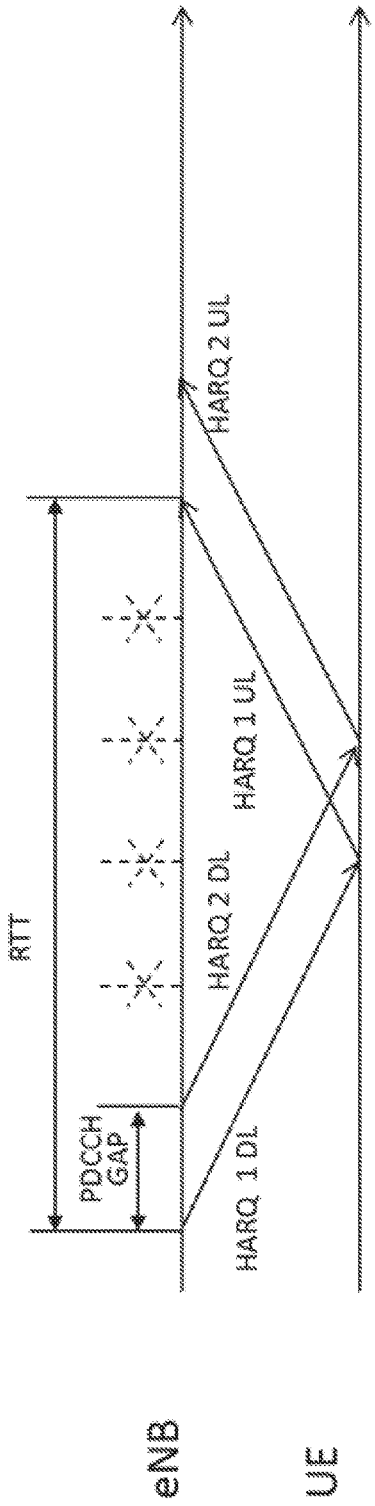

FIG. 3C shows another example of PDCCH monitoring with reduced UE power. In this example, the RTT is provided to the UE. Once the UE detects maxHARQProcessNumber of scheduled DL HARQ processes and maxHARQProcessNumber of scheduled UL HARQ processes in one RTT duration, the UE terminates PDCCH monitoring in the RTT duration.

Figure 3D:
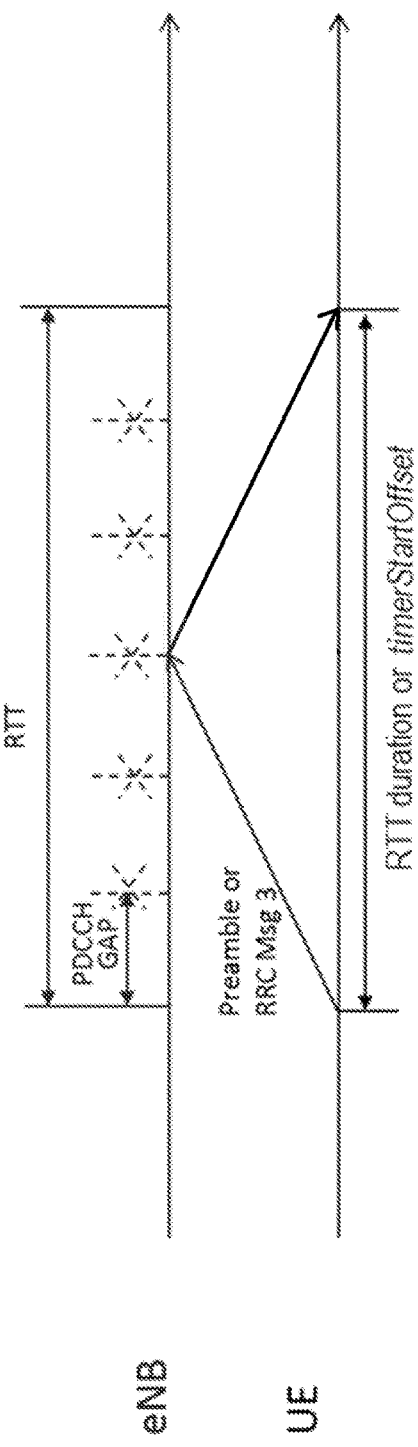

FIG. 3D shows yet another example of PDCCH monitoring with reduced UE power. In this example, the minimal RTT and/or a timerStartOffset parameter is provided to UE. When the UE transmits Msg1 (Preamble) or RRC Msg3, the UE does not monitor the PDCCH in the subsequent time duration of the minimal RTT and/or timerStartOffset, because only one HARQ process is supported in random access process, and the eNB does not schedule the UE until it receives the UL transmission. In an example, the timerStartOffset parameter is the timer that the eNB provides to delay the UE to start ra-ResponseWindowSize and/or mac-ContentionResolutionTimer.

Figure 3E:
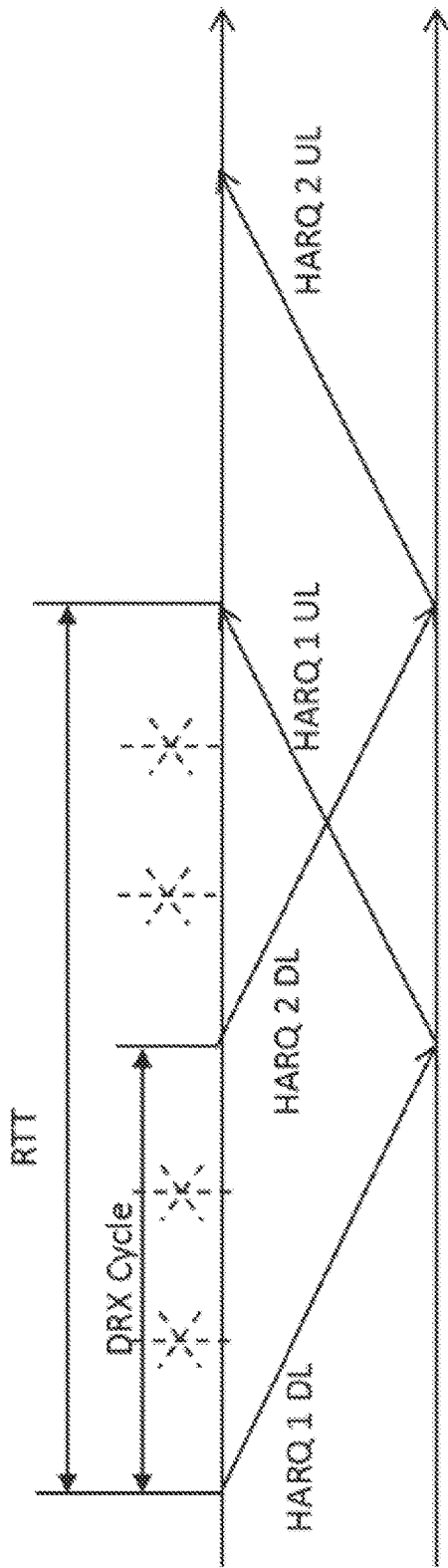

FIG. 3E shows yet another example of PDCCH monitoring with reduced UE power. In this example, the Discontinuous Reception (DRX) cycle for PDCCH monitoring is provided to UE. When the UE receives its dedicated PDCCH for UL or DL scheduling, the UE does not monitor the PDCCH in the subsequent time duration of the DRX cycle. It is noted that the RAT does not require that the PDCCH monitoring gap is not supported, e.g. NR.

Figure 3F:
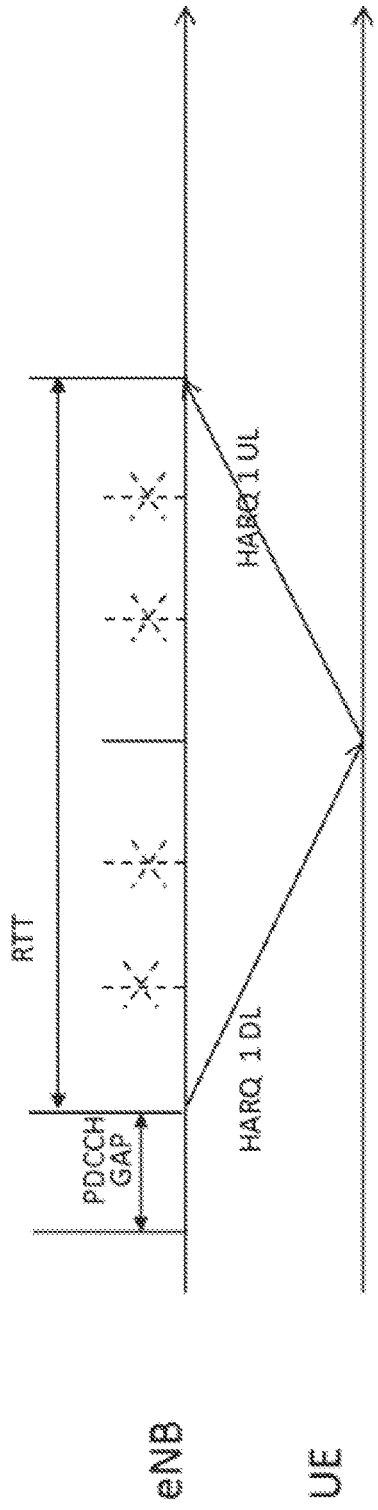

FIG. 3F shows yet another example of PDCCH monitoring with reduced UE power. In this example, the RTT is provided to the UE. Once the UE detects a predefined number of PDCCH in one RTT duration, the UE will mute (or not monitor) a predefined PDDCH occasions. In an example, before detecting a scheduled PDCCH, the UE monitors the PDCCH in every PDCCH occasion, but once it detects one scheduled PDCCH, it will mute two PDCCH occasions every three PDCCH occasions. Herein, the predefined number of PDCCH and the predefined PDCCH occasions can be defined by a specification or signaled by the eNB (e.g., in a System Information Block).

In some embodiments, to support the examples described in FIGS. 3B-3F, at least one of the following mechanisms are supported:
1. New large values for npdcch-StartSF-USS and/or mpdcch-StartSF-UESS should be supported (for the example shown in FIG. 3B for NB-IoT or eMTC over NTN)
2. The RTT duration is provided to the UE (for the example shown in FIG. 3C)
3. When the UE transmits Msg1(Preamble) or RRC Msg3, the UE does not monitor the PDCCH in the subsequent time duration of the RTT and/or timerStartOffset (for the example shown in FIG. 3D)
4. The DRX cycle for PDCCH monitoring is provided to the UE (for the example shown in FIG. 3E)
5. For a predefined number of PDCCH in one RTT duration, the UE will mute predefined PDDCH occasions.

Example Embodiments for Cell Selection and Reselection

Figure 4A:
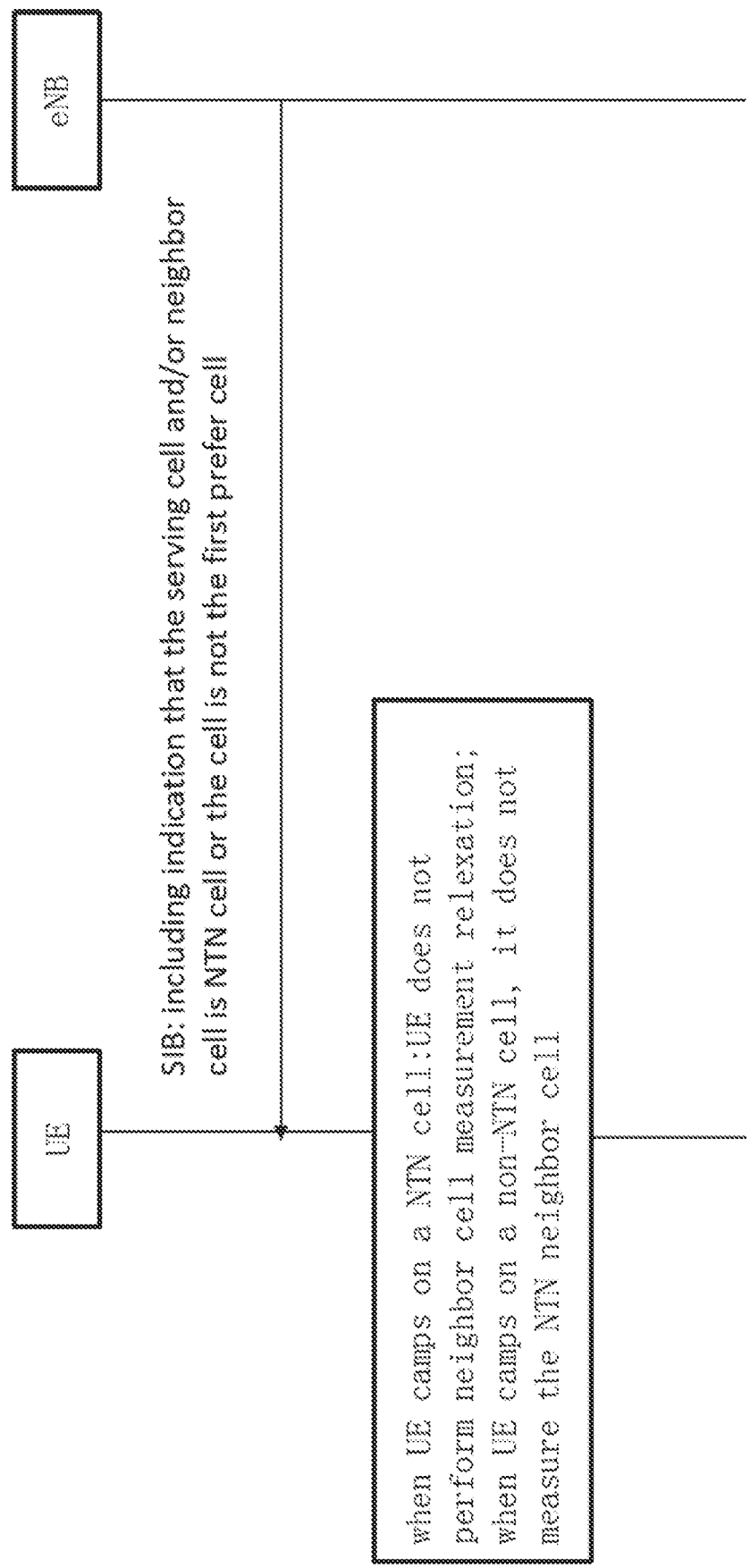
FIG. 4A shows an example of cell selection and reselection.

FIG. 4A shows an example of cell selection and reselection with reduced UE power. As shown therein, the SIB includes an indication that the cell is an NTN cell or the cell is not the primary preferred cell (e.g., a cell with low priority that has a large coverage area and not suited for multiple UEs to camp on). In an example, the indication can be provided per carrier, which applies to all the cells of the carrier. In another example, the indication can be provided per cell, which applies to the cell.

In this example, when the UE camps on a NTN cell (and with an indication that the cell is an NTN cell or the cell is not the primary preferred cell), the UE does not perform neighbor cell measurement relaxation, e.g., relaxed monitoring in the idle mode is not performed, the intra-frequent measurement is still performed irrelevant of $S_{IntraSearchP}$ and $S_{IntraSearchQ}$, the inter-frequent and/or inter-RAT measurement is still performed irrelevant of the $S_{nonIntraSearchP}$ and $S_{nonIntraSearchQ}$.

Furthermore, when the UE camps on a TN cell (e.g., without the indication), the UE does not perform NTN neighbor cell measurement (which is equivalent to the NTN neighbor cell being in the BlackCellList).

Figure 4B:
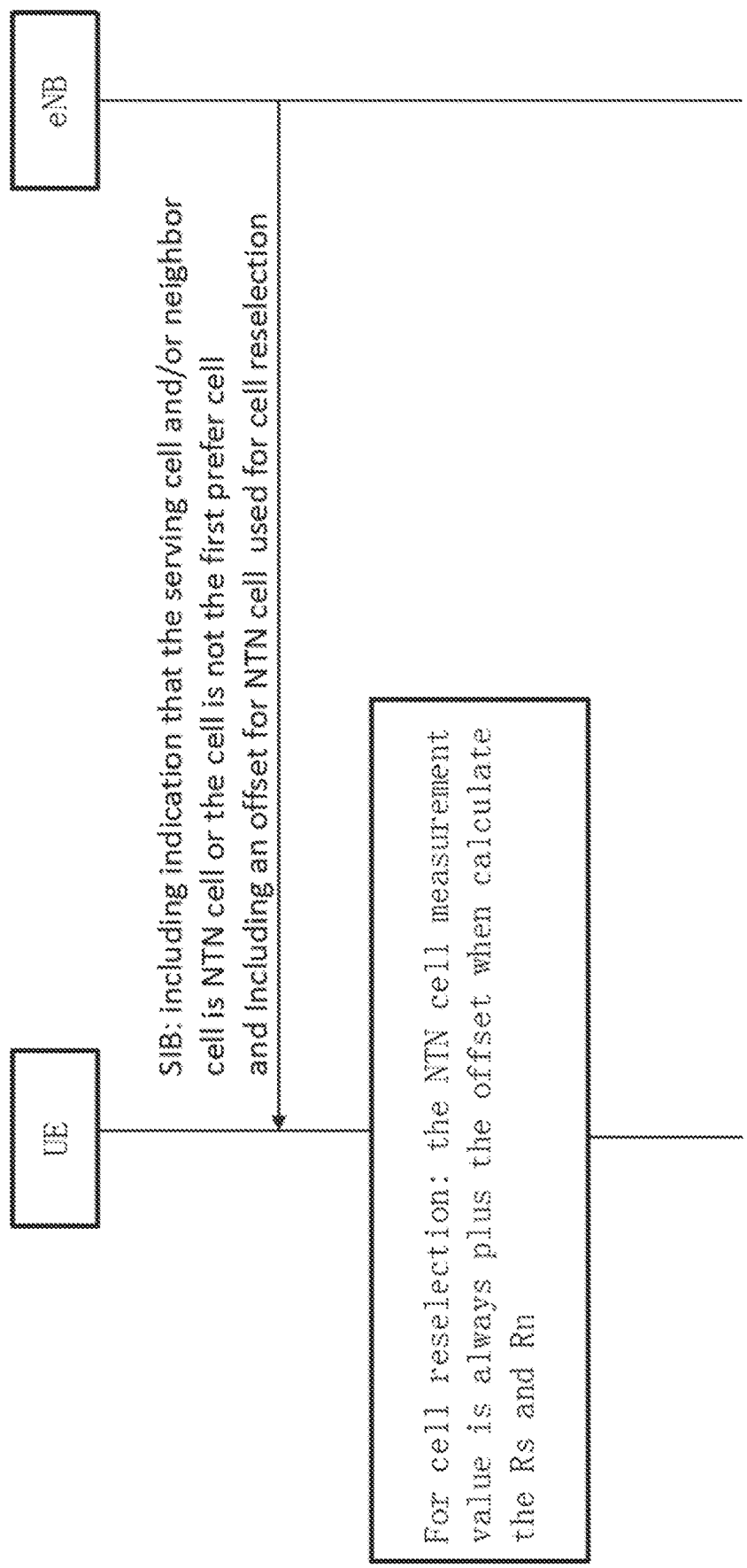
FIG. 4B shows another example of cell selection and reselection.

FIG. 4B shows another example of cell selection and reselection with reduced UE power. As shown therein, the SIB includes an indication that the cell is an NTN cell or the cell is not the primary preferred cell (e.g., a cell with low priority that has a large coverage area and not suited for multiple UEs to camp on). Furthermore, the SIB also includes an offset for the NTN cell that is used for cell reselection. In an example, the indication can be provided per carrier, which applies to all the cells of the carrier. In another example, the indication can be provided per cell, which applies to the cell.

In this example, when performing the cell-ranking with criterion $R_s$ for serving cell and $R_n$ for neighboring cells, the NTN cell measurement value is always determined after subtracting the offset to calculate $R_s$ and $R_n$. For example:

$$R_s = Q_{meas,s} + Q_{hyst} - Q_{offsettemp} + Q\text{offset}_{SCPTM} - Q\text{offset}_{NTN}$$

$$R_n = Q_{meas,n} + Q_{hyst} - Q_{offsettemp} + Q\text{offset}_{SCPTM} - Q\text{offset}_{NTN}$$

Herein, $Q\text{offset}_{NTN}$ is the offset for the NTN cell used for cell reselection, which can be provided by SIB, or predefined in a specification.

In some embodiments, the offset can be split into two parameters: $Q\text{offset}_{NTN-GEO}$ and $Q\text{offset}_{NTN-LEO}$ that are used for a geostationary orbit (GEO) NTN cell and a low-earth orbit (LEO) NTN cell, respectively.

In some embodiments, the offset can be configured to be a single value (e.g., in SIB1, SIB2, SIB3) and used for both the serving cell and the neighbor cell. In other embodiments, the offset can be configured to be different values used for the serving cell (e.g. in SIB1, SIB2, SIB3) and the neighbor cell (e.g. in SIB4/SIB5) independently.

Figure 4C:
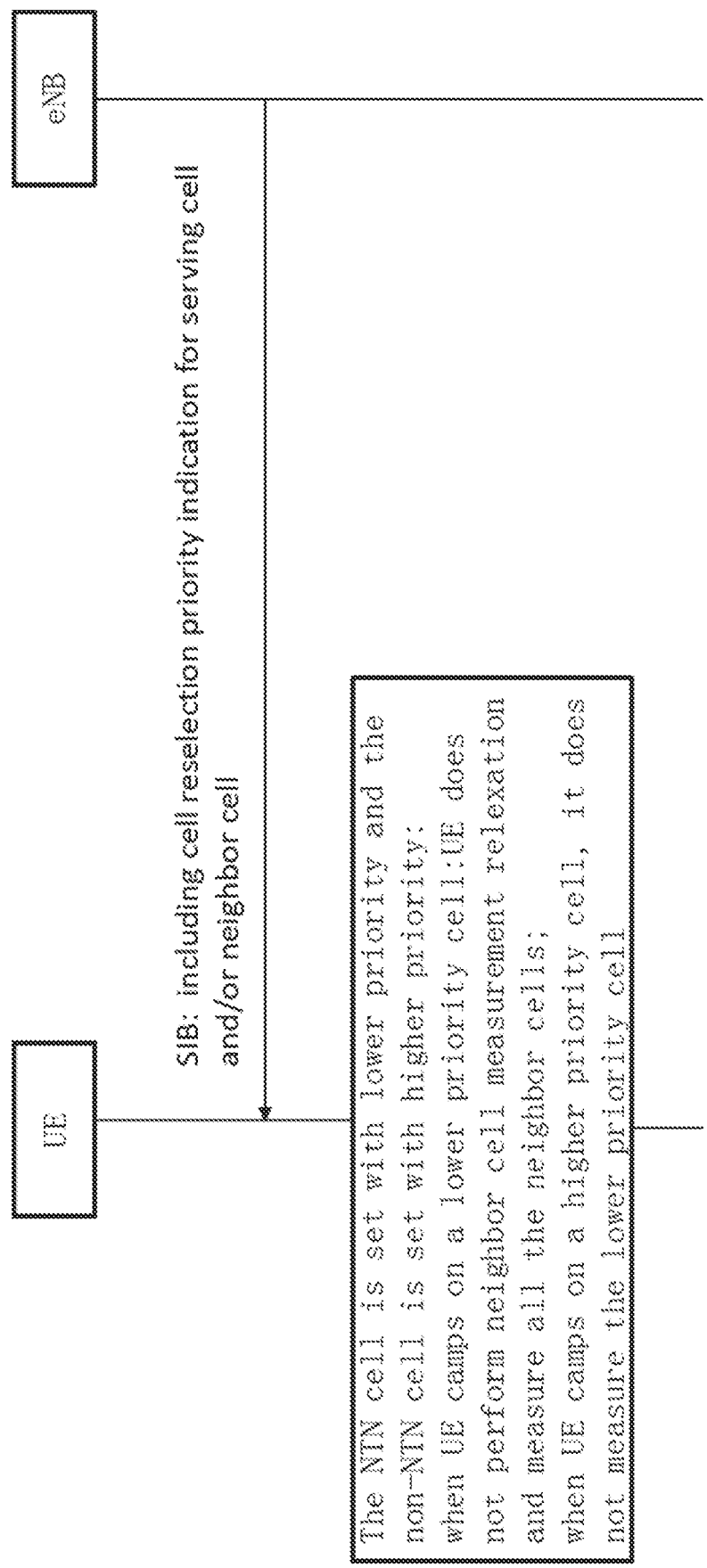
FIG. 4C shows yet another example of cell selection and reselection.

FIG. 4C shows another example of cell selection and reselection with reduced UE power. In this example, the SIB includes a cell reselection priority indication for the serving cell, the neighbor cell and/or the neighbor carrier. For the case when the NTN cell is set with a lower priority and the non-NTN cell is set with a higher priority, the following rules apply:

- When the UE camps on a lower priority cell, the UE does not perform neighbor cell measurement relaxation and measures all the neighbor cells.
- When UE camps on a higher priority cell, the UE does not measure the lower priority cell.

In some embodiments, the UE may consider a NTN cell with the lowest priority (which can be interpreted as the lowest priority indication being configured for an NTN cell or an NTN carrier).

Example Methods and Implementations for the Disclosed Technology

FIG. 5A shows an example of a wireless communication method 510. The method 510 includes, at operation 512, transmitting, by a first network node to a wireless device, a block of system information, wherein the block of system information is a block of system information of a first type, a block of system information of a second type, or a block of system information of a third type.

In some embodiments, the block of system information of the first type comprises cell-specific parameters for cell selection or cell reselection by the wireless device, the block of system information of the second type comprises parameters for connection setup or service setup, and the block of system information of the third type comprises parameters associated with a change in system information.

In some embodiments, the method 510 further includes the operations of transmitting, by the first network node to a second network node that is a neighbor of the first network node, a request for system information, and receiving, from the second network node, the system information associated with the second network node.

In some embodiments, the method 510 further includes the operations of receiving, by the first network node from a second network node that is a neighbor of the first network node, system information associated with the second network node, wherein the second network node is configured to transmit the system information upon a determination of one or more of (a) the second network node powering up, (b) a connection establishment or reestablishment between the first network node and the second network node, and (c) a change in the system information associated with the second network node.

In some embodiments, the block of system information from the first network node comprises the system information associated with the second network node.

FIG. 5B shows an example of a wireless communication method 520. The method 520 includes, at operation 522, receiving, by a wireless device from a first network node, a first block of system information, wherein the first block of system information is a block of system information of a first type, a block of system information of a second type, or a block of system information of a third type.

In some embodiments, the block of system information of the first type comprises cell-specific parameters for cell selection or cell reselection by the wireless device, the block of system information of the second type comprises parameters for connection setup or service setup, and the block of system information of the third type comprises parameters associated with a change in system information.

In some embodiments, a type of the block of system information is acquired based on a usage occasion and/or change probability of the block of system information of the first type, the second type, and the third type.

In some embodiments, the system information comprises cell selection related information and network information that configures the wireless device to determine whether a network, a cell, or a neighbor cell is preferred, and wherein the system information further comprises at least one of load information, a service type supported, antenna information, radio access technology (RAT) information, cell location information, a neighbor cell measurement and/or selection priority, network holographic topology information, and a layout plan.

In some embodiments, the method 520 further comprises the operations of receiving, from a second network node, a second block of system information, storing the first block of system information and the second block of system information, and performing, based on stored blocks of system information, a cell reselection process.

In some embodiments, the storing is based on at least one of a system information valid timer, a system information valid start occasion, and a system information valid end occasion.

In some embodiments, the first network node and the second network node are non-terrestrial network (NTN) nodes, and wherein the block of system information is a system information block (SIB).

In some embodiments, the parameters for connection setup or service setup are mobile originated (MO) parameters comprising physical random access channel (PRACH) parameters, access barring (AB) parameters, extended access barring (EAB) parameters, or unified access control (UAC) parameters.

In some embodiments, the MO parameters are acquired and/or processed upon a determination that the wireless device is establishing a radio resource control (RRC) connection.

In some embodiments, the parameters in the block of system information of the third type are configured to trigger mobile terminated (MT) services and comprise paging control channel (PCCH) parameters.

Figure 5C:
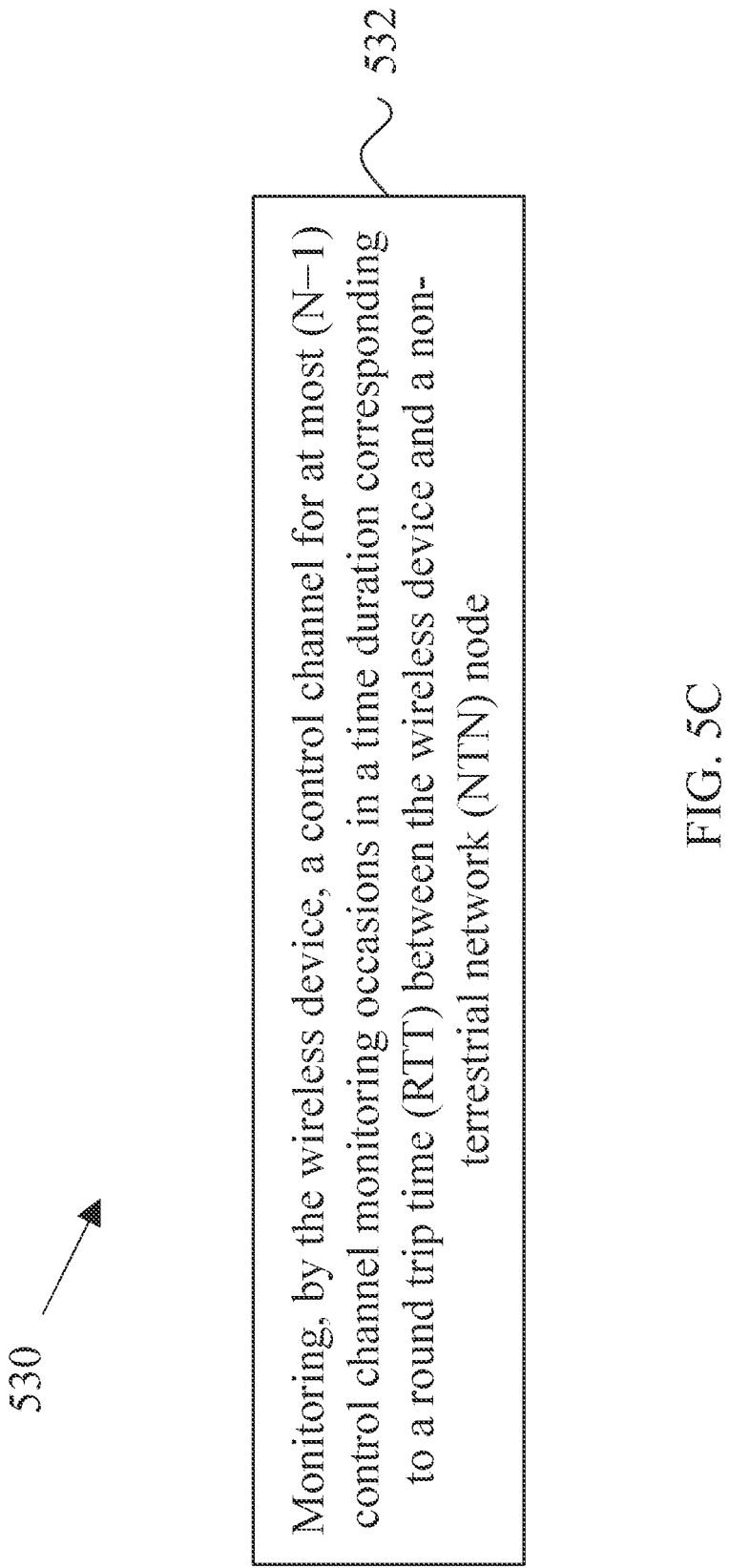

FIG. 5C shows an example of a wireless communication method 530. The method 530 includes, at operation 532, monitoring, by a wireless device, a control channel for at most (N−1) control channel monitoring occasions in a time duration corresponding to a round trip time (RTT) between the wireless device and a non-terrestrial network (NTN) node.

In some embodiments, the RTT comprises N control channel monitoring occasions, the wireless device is configured to receive the control channel at one or more of the N control channel monitoring occasions, and N is a positive integer and N≥2.

In some embodiments, the monitoring is performed by switching, prior to the monitoring, from a first mode to a second mode, wherein the control channel is monitored in the second mode, and wherein a number of control channel monitoring occasions in the second mode is less than a number of control channel monitoring occasions in the first mode.

In some embodiments, a time interval between two adjacent occasions is a predetermined value, and the method 530 further comprises the operation of increasing the time interval based on a process number of hybrid automatic repeat request (HARQ) messages received in the RTT (denoted HARQProcessNumber).

In some embodiments, the time interval between two adjacent occasions is determined as floor(RTT/(2×HARQProcessNumber)).

In some embodiments, the at most (N−1) control channel monitoring occasions correspond to a first maxHARQProcessNumber of scheduled hybrid automatic repeat request (HARQ) messages, and maxHARQProcessNumber is an integer.

In some embodiments, a time duration between an uplink message transmission and a control channel monitoring start occasion for a subsequent downlink message scheduling is equal to a minimal RTT.

In some embodiments, the method 530 further comprises the operation of receiving, from the NTN node, a timing parameter, wherein a time duration between a first of the (N−1) control channel monitoring occasions and a second of the (N−1) control channel monitoring occasions is based on the timing parameter.

In some embodiments, the timing parameter is based on a timer.

In some embodiments, the timing parameter is based on a discontinuous reception (DRX) cycle parameter.

In some embodiments, the at most (N−1) control channel monitoring occasions are predetermined prior to the monitoring.

Figure 5D:
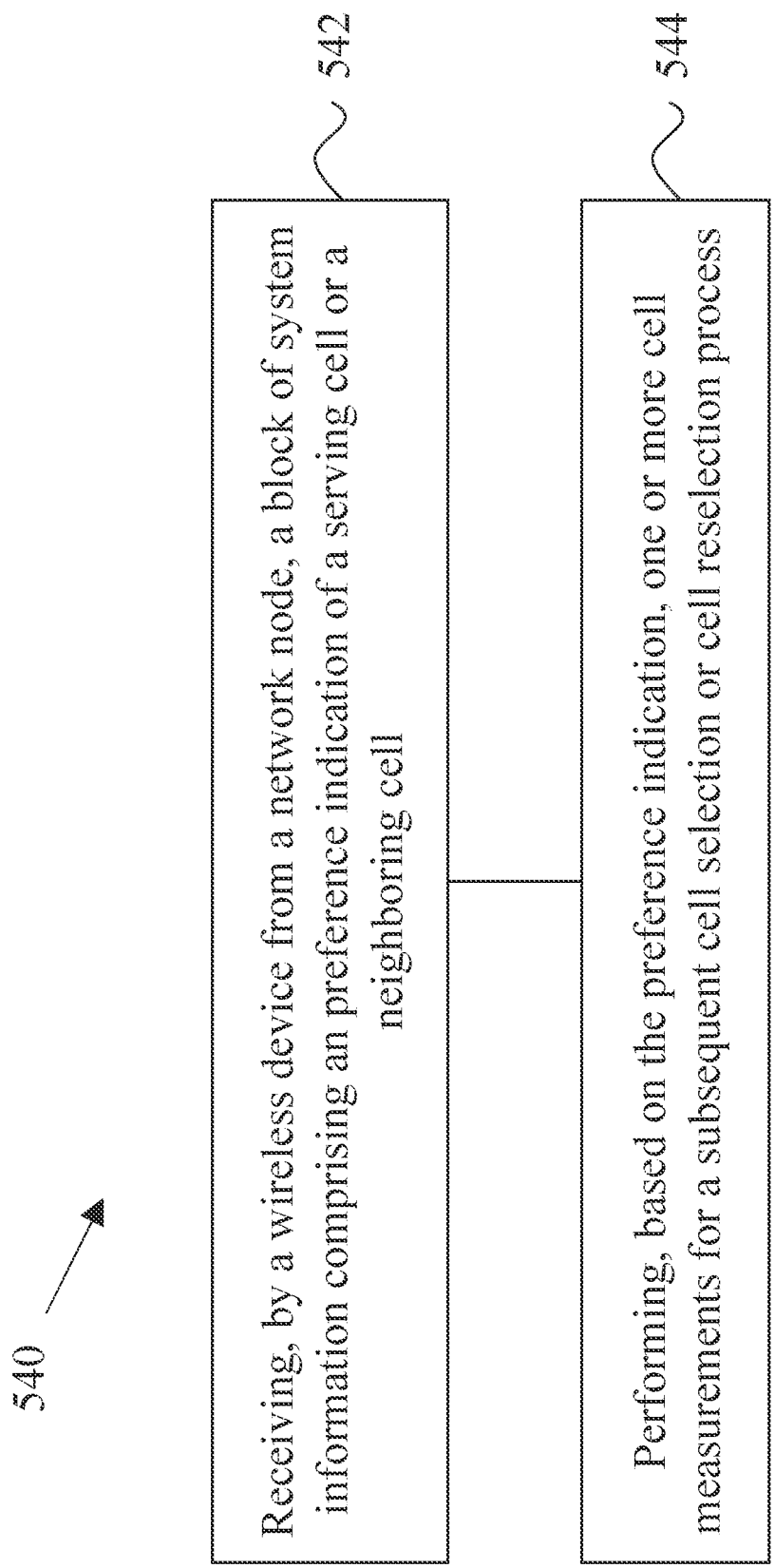

FIG. 5D shows an example of a wireless communication method 540. The method 540 includes, at operation 542, receiving, by a wireless device from a network node, a block of system information comprising an preference indication of a serving cell or a neighboring cell.

The method 540 includes, at operation 544, performing, based on the preference indication, one or more cell measurements for a subsequent cell selection or cell reselection process.

Figure 5E:
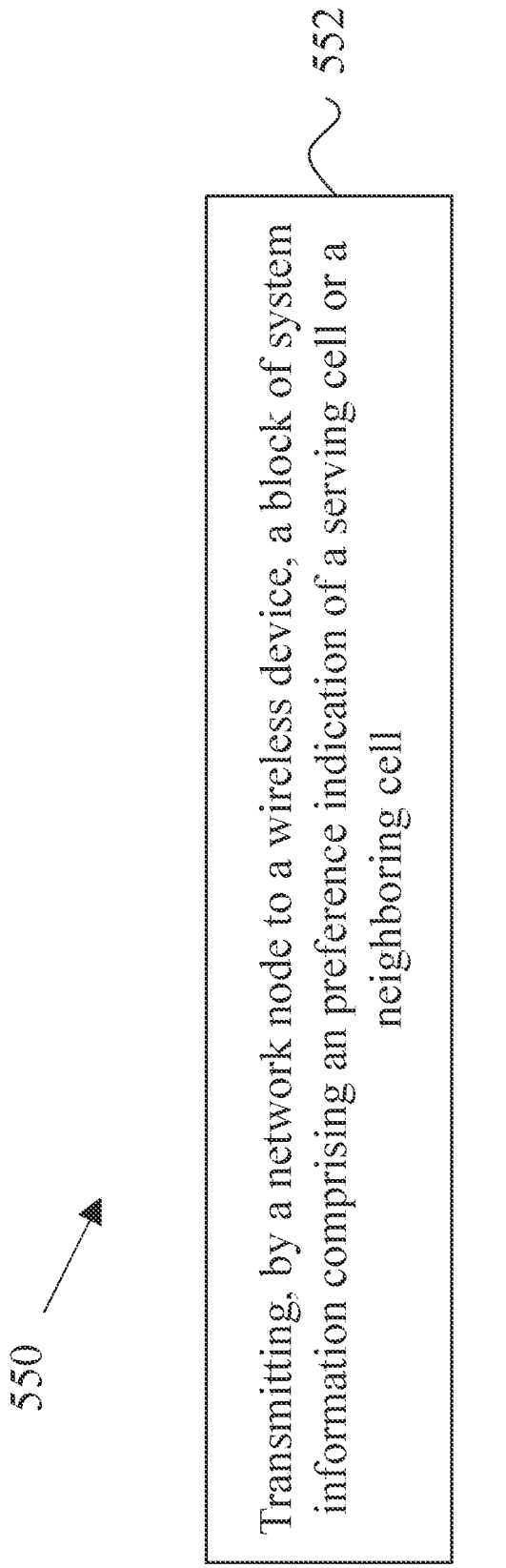

FIG. 5E shows an example of a wireless communication method 550. The method 550 includes, at operation 552, transmitting, by a network node to a wireless device, a block of system information comprising an preference indication of a serving cell or a neighboring cell.

In some embodiments, the wireless device is configured to perform, based on the preference indication, one or more cell measurements for a subsequent cell selection or cell reselection process.

In some embodiments, the network node is a non-terrestrial network (NTN) node, and wherein the preference indication comprises a priority for a terrestrial network node or a cell type.

In some embodiments, the cell type is a Non-Terrestrial Network (NTN) cell or a Terrestrial Network (TN) cell.

In some embodiments, the one or more cell measurements comprises an offset when a measurement corresponds to the NTN node.

In some embodiments, the offset is a first value when the NTN node is in a geostationary earth orbit and a second value when the NTN node is in a low-earth orbit.

In some embodiments, a priority of a terrestrial network node is higher than a priority of a non-terrestrial network (NTN) node.

In some embodiments, the block of system information is a system information block.

Figure 6:
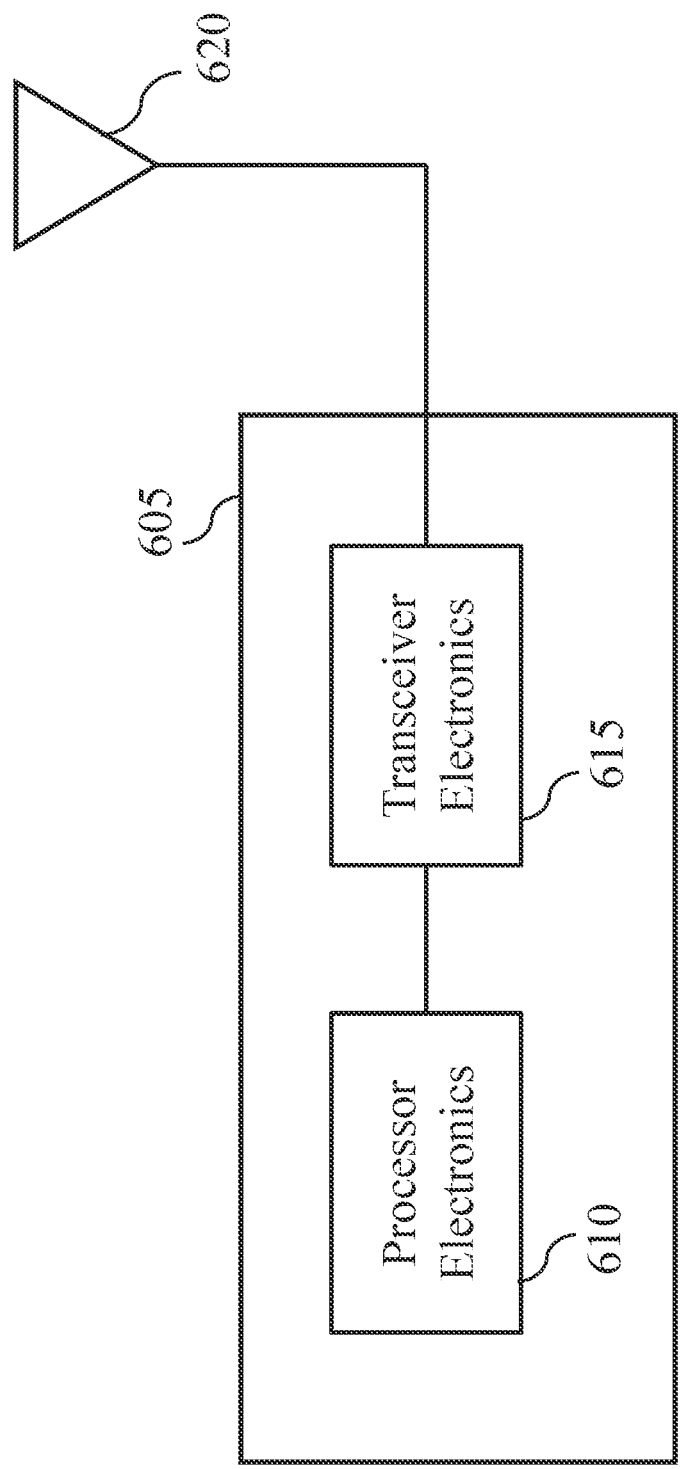
FIG. 6 is a block diagram representation of a portion of an apparatus that can be used to implement methods and techniques described in this document.

FIG. 6 is a block diagram representation of a portion of an apparatus that can be used to implement methods (including, but not limited to method 500) and techniques described in this document. An apparatus 605, such as a base station or a wireless device (or UE), can include processor electronics 610 such as a microprocessor that implements one or more of the techniques presented in this document. The apparatus 605 can include transceiver electronics 615 to send and/or receive wireless signals over one or more communication interfaces such as antenna(s) 620. The apparatus 605 can include other communication interfaces for transmitting and receiving data. Apparatus 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the apparatus 605.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
monitoring, by a wireless device, a control channel for at most (N−1) control channel monitoring occasions in a time duration corresponding to a round trip time (RTT) between the wireless device and a non-terrestrial network (NTN) node,
wherein the RTT comprises N control channel monitoring occasions, wherein the wireless device is configured to receive the control channel at one or more of the N control channel monitoring occasions, and wherein N is a positive integer and N≥2; and
increasing a time interval between two adjacent occasions based on a process number of hybrid automatic repeat request (HARQ) messages received in the RTT,
wherein the time interval is a predetermined value, and wherein the time interval is determined as floor (RTT/(2×HARQProcessNumber)), HARQProcessNumber denoting the process number of HARQ messages received in the RTT.

2. The method of claim 1, wherein the monitoring is performed by switching, prior to the monitoring, from a first mode to a second mode, wherein the control channel is monitored in the second mode, and wherein a number of control channel monitoring occasions in the second mode is less than a number of control channel monitoring occasions in the first mode.

3. The method of claim 1, wherein the at most (N−1) control channel monitoring occasions correspond to a first maxHARQProcessNumber of scheduled hybrid automatic repeat request (HARQ) messages, and wherein maxHARQProcessNumber is an integer.

4. The method of claim 1, wherein a time duration between an uplink message transmission and a control channel monitoring start occasion for a subsequent downlink message scheduling is equal to a minimal RTT.

5. The method of claim 1, further comprising:
receiving, from the NTN node, a timing parameter,
wherein a time duration between a first of the at most (N−1) control channel monitoring occasions and a second of the at most (N−1) control channel monitoring occasions is based on the timing parameter.

6. The method of claim 5, wherein the timing parameter is based on a timer.

7. The method of claim 5, wherein the timing parameter is based on a discontinuous reception (DRX) cycle parameter.

8. The method of claim 1, wherein the at most (N−1) control channel monitoring occasions are predetermined prior to the monitoring.

9. A wireless communication apparatus comprising a processor and a memory storing instructions, execution of which by the processor causes the apparatus to perform operations comprising:
monitor a control channel for at most (N−1) control channel monitoring occasions in a time duration corresponding to a round trip time (RTT) between the wireless communication apparatus and a non-terrestrial network (NTN) node,
wherein the RTT comprises N control channel monitoring occasions, wherein the wireless communication apparatus is configured to receive the control channel at one or more of the N control channel monitoring occasions, and wherein N is a positive integer and N≥2; and
increase a time interval between two adjacent occasions based on a process number of hybrid automatic repeat request (HARQ) messages received in the RTT,
wherein the time interval is a predetermined value, and wherein the time interval is determined as floor (RTT/(2×HARQProcessNumber)), HARQProcessNumber denoting the process number of HARQ messages received in the RTT.

10. The apparatus of claim 9, wherein the monitoring is performed by switching, prior to the monitoring, from a first mode to a second mode, wherein the control channel is monitored in the second mode, and wherein a number of control channel monitoring occasions in the second mode is less than a number of control channel monitoring occasions in the first mode.

11. The apparatus of claim 9, wherein the at most (N−1) control channel monitoring occasions correspond to a first maxHARQProcessNumber of scheduled hybrid automatic repeat request (HARQ) messages, and wherein maxHARQProcessNumber is an integer.

12. The apparatus of claim 9, wherein a time duration between an uplink message transmission and a control channel monitoring start occasion for a subsequent downlink message scheduling is equal to a minimal RTT.

13. The apparatus of claim 9, wherein the operations further comprise:
receiving, from the NTN node, a timing parameter,
wherein a time duration between a first of the at most (N−1) control channel monitoring occasions and a second of the at most (N−1) control channel monitoring occasions is based on the timing parameter.

14. The apparatus of claim 13, wherein the timing parameter is based on a timer.

15. The apparatus of claim 13, wherein the timing parameter is based on a discontinuous reception (DRX) cycle parameter.

16. The apparatus of claim 9, wherein the at most (N−1) control channel monitoring occasions are predetermined prior to the monitoring.

* * * * *